Nov. 18, 1958     A. V. NOZELL     2,860,586
DRY FERTILIZER INJECTOR
Filed May 9, 1955
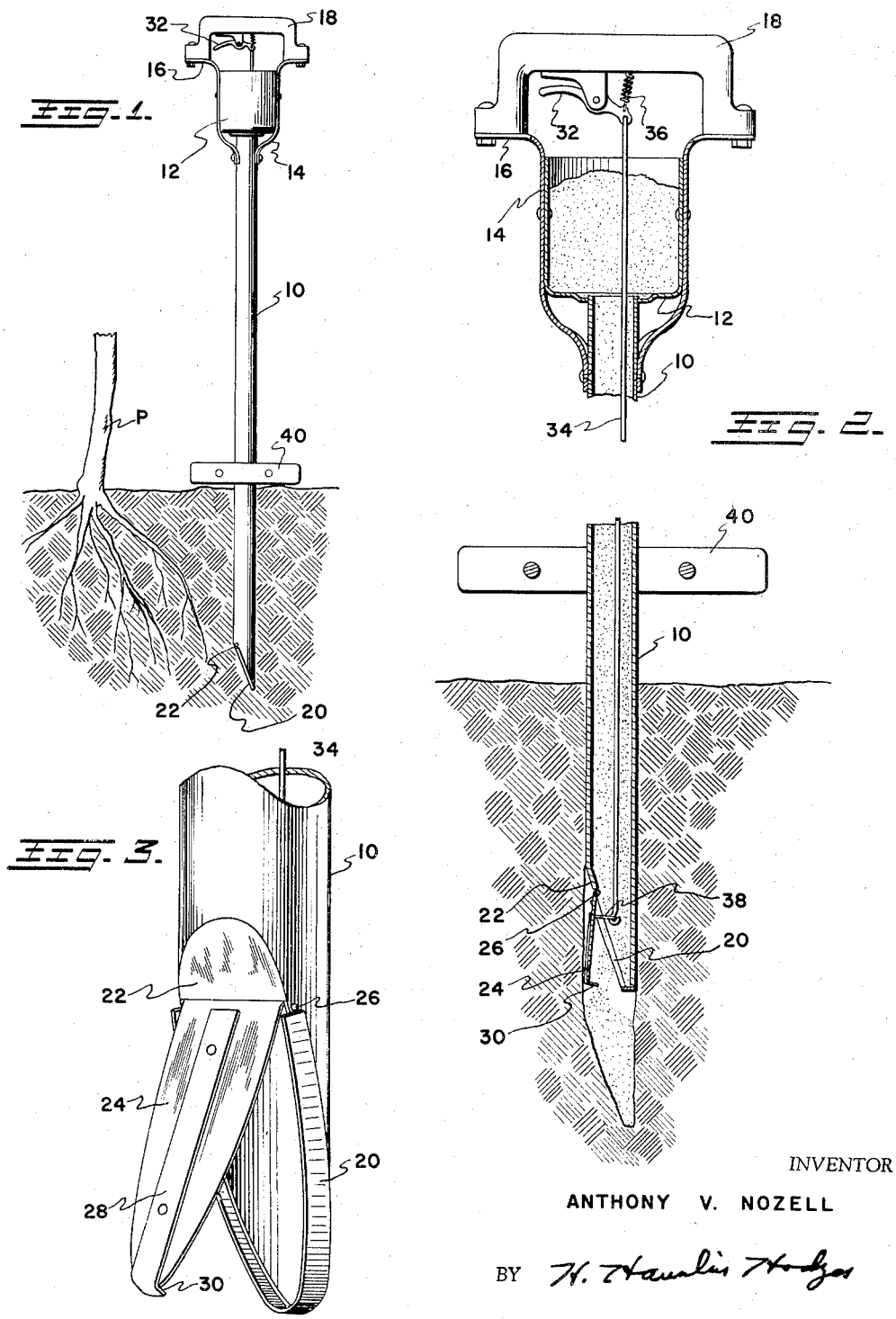
INVENTOR
ANTHONY V. NOZELL
BY
ATTORNEY

United States Patent Office 2,860,586
Patented Nov. 18, 1958

2,860,586

DRY FERTILIZER INJECTOR

Anthony V. Nozell, Corpus Christi, Tex.

Application May 9, 1955, Serial No. 506,700

3 Claims. (Cl. 111—92)

This invention relates to a device that is designed particularly for the purpose of injecting dry fertilizer, insecticide, germicide or the like into the ground in the close vicinity of the root structure of a plant growth that is to be cultivated and/or protected.

An object of my invention is to provide a dry fertilizer injector having an elongated tube through which powdered material may pass from a reservoir to a selected spot beneath the ground level.

Another object is to provide a dry fertilizer injector having an elongated hollow tube provided with a sharpened end, and being in communication at its other end with a supply reservoir.

A further object of my invention is to provide a dry fertilizer injector having an elongated hollow tube in direct communication at one end thereof with a supply reservoir and having at its other end a sharpened point and a tube closure trap.

A still further object of my invention is to provide a dry fertilizer injector having an elongated hollow tube provided with a supply reservoir in communication with one end thereof and a trap covered opening at the other end thereof.

An even further object is to provide a dry fertilizer injector having an elongated hollow tube in communication at one end thereof with a supply reservoir and at its other end with a trigger controlled closure trap.

In the drawings:

Figure 1 is a view in front elevation showing the injector fully inserted into the ground near the roots of a plant;

Figure 2 is an enlarged view in vertical cross section with parts broken away, showing the injector partly retracted and the trap open; and Figure 3 is an enlarged view in perspective showing the trap in open position.

The dry fertilizer injector includes an elongated hollow tube 10 on the top end of which is concentrically mounted a circular chamber or container 12 which is welded or otherwise secured to the hollow tube to be in direct communication therewith. Riveted, or otherwise suitably secured to the outside surface of the container 12, I provide suitable metal straps 14 which are also riveted to the hollow tube 10. The ends of the straps 14 extend above the upper edge of the container 12 and are bent at approximate right angles to provide ears 16 to which a suitable handle 18 is secured in position extending transversely over the upper edge of the container 12.

The end of the hollow tube 10 remote from the container and handle is cut at an angle to its axis to provide a substantially large opening. Around a substantial portion of the opening I provide an outstanding band 20 which is brazed or welded to the tube 10. To cover the portion of the opening that is not surrounded by the band 20 I braze or weld into position a metallic heel 22. At the approximate point of meeting of the heel 22 and the ends of the band 20, I pivotally secure a trap or closure plate 24 by the use of a conventional pivot pin 26, the ends of which extend through the opposite sides of the hollow tube 10. A wear plate 28 is attached longitudinally to the closure plate 24 on the outside thereof. The end of the wear plate 28 remote from the pivot pin 26 is provided with a lip 30 which is bent at an approximate right angle thereto. The lip 30 is provided so that when the trap 24 is in its closed position it will be maintained in a plane approximately the same as a plane lying along the outer edge of the band 20. Thus, a suitable area will be provided to hold dry fertilizer, and also to prevent the trap from being forced within the band 20 by pressure of the earth or soil being penetrated.

On the under side (the side nearest the container 12) of the handle 18 I provide a suitable trigger 32, to one end of which I pivotally attach a push rod 34. At the end of the trigger which is pivotally attached to the push rod, I attach a tension spring 36, which at its other end is attached to the handle 18. The push rod 34 extends longitudinally through the hollow tube 10 and at its end remote from the handle 18 is pivotally secured to a rod or link 38 which is secured to, and extends inwardly from, the trap 24.

Secured to the outside of the tube 10, and positioned a suitable distance from its pointed end, I provide a transversely extending stop or foot rest 40. The stop is properly positioned so that the hollow tube 10 may be readily forced into its desired position in the ground, and cannot be inserted too far therein.

In using the dry fertilizer injector, the container 12 is filled with the dry fertilizer, or other material, that is to be used. The operator then inserts the pointed end of the hollow tube into the ground at the desired point in the general vicinity of the plant to be treated. This may readily be done by pressing downwardly on the handle and also pushing with his foot on the foot rest or stop 40. After the injector has been inserted the desired distance, the foot rest will be in contact with the ground surface to preclude any further insertion of the injector. After the injector has been thus inserted, the operator will pull it slightly upwardly (into the position in which it is shown in Figure 2) and will then pull the trigger 32 and quickly release the same. The pull on the trigger will force the push rod 34 downwardly, and consequently the trap 24 outwardly from the hollow tube 10, releasing the fertilizer from the container 14 and the tube. The amount of fertilizer released will be entirely dependent on the length of time that the trigger is pulled upwardly.

After the above described operation has been completed the same may be done over and over again at any desired spots where fertilizer is to be applied, preferably near the base, or root area, of a plant to be cultivated, such as the plant P.

It will be noted that I have provided a cultivating tool which includes a relatively thick elongated tube having a sharpened end which is adapted to be inserted into the ground surrounding the plant that is to be cultivated. With this construction the tool may easily be used in hard soil that has not necessarily been previously cultivated.

While I have shown one particular construction of my dry fertilizer injector which has been found to be highly satisfactory in operation, it will be understood that minor changes in the mechanically cooperating parts of the injector may be made from time to time without departing from the spirit of the invention or the scope of the appended claims.

I claim:

1. A fertilizer injector including a hollow tube, a communicating container secured to one end of said tube, an oblique opening in the other end of said tube, a handle positioned above said container, a closure hingedly secured to said tube at the edge of said oblique opening remote from the end of said tube and adapted to open and close said opening, a band outstanding from the edge of said opening, a lip extending from, and bent at right angles to, said closure and having a length approximately equal to the width of said band, and means, including a push rod within said tube, associated with said handle adapted to open and close said closure and opening.

2. A fertilizer injector including a hollow tube, a communicating container secured to one end of said tube, an oblique opening in the other end of said tube, an upstanding band substantially circumventing said opening, a hingedly secured closure adapted to close said opening, an elongated wear plate secured to the outer surface of said closure, and an inwardly extending lip bent from an end of said wear plate, the length of said lip being approximately equal to the width of said band.

3. A fertilizer injector including a hollow tube, a container secured to one end of said tube and in communication therewith, an oblique opening at the other end of said tube, a closure plate hingedly secured at the upper end of said opening, a handle positioned above said container, a trigger attached to said handle, a push rod extending between said trigger and the closure, and a wear plate extending longitudinally of the closure, the end thereof being bent inwardly and forming a closure stop.

References Cited in the file of this patent

UNITED STATES PATENTS

| | | |
|---|---|---|
| 360,345 | Haines | Mar. 29, 1887 |
| 1,077,822 | Engleman | Nov. 4, 1913 |
| 1,296,771 | Dady | Mar. 11, 1919 |
| 1,452,110 | Elliot | Apr. 17, 1923 |
| 1,610,767 | Gourlay | Dec. 14, 1926 |
| 2,218,652 | McDannel et al. | Oct. 22, 1940 |
| 2,656,071 | Smith | Oct. 20, 1953 |
| 2,783,581 | Lee | Mar. 5, 1957 |